TROUBLE RECORDING ON TIME-OUT CIRCUIT FOR AUTOMATIC TELEPHONE

Filed Sept. 14, 1954 4 Sheets-Sheet 1

INVENTORS: J. W. GORGAS
E. JACOBITTI
R. J. JAEGER, JR.
C. G. MORRISON
J. B. NEWSOM
BY C. Mattice
ATTORNEY

TROUBLE RECORDING ON TIME-OUT CIRCUIT FOR AUTOMATIC TELEPHONE

Filed Sept. 14, 1954 4 Sheets-Sheet 2

INVENTORS: J.W. GORGAS
E. JACOBITTI
R. J. JAEGER, JR.
C. G. MORRISON
J. B. NEWSOM
BY C. Mattice
ATTORNEY

TROUBLE RECORDING ON TIME-OUT CIRCUIT FOR AUTOMATIC TELEPHONE

INVENTORS: J.W. GORGAS
E. JACOBITTI
R.J. JAEGER, JR.
C.G. MORRISON
J.B. NEWSOM

BY C. Mattice
ATTORNEY

TROUBLE RECORDING ON TIME-OUT CIRCUIT FOR AUTOMATIC TELEPHONE

Filed Sept. 14, 1954 4 Sheets-Sheet 4

INVENTORS: J. W. GORGAS
E. JACOBITTI
R. J. JAEGER, JR.
C. G. MORRISON
J. B. NEWSOM
BY C. Mathie United States Patent Office 2,820,099

Patented Jan. 14, 1958

2,820,099

TROUBLE RECORDING ON TIME-OUT CIRCUIT FOR AUTOMATIC TELEPHONE

John W. Gorgas, Hollis, N. Y., Edward Jacobitti, Newark, N. J., Richard J. Jaeger, Jr., West Hempstead, N. Y., Charles G. Morrison, Livingston, N. J., and James B. Newsom, Great Neck, N. Y., assignors to Bell Telephone Laboratories, Incorporated, New York, N. Y., a corporation of New York Application September 14, 1954, Serial No. 455,822

15 Claims. (Cl. 179—8.5)

This invention relates to telephone systems and has for one of its objects the provision of improved means for making records of abnormal traffic conditions.

This invention finds its primary use in connection with such complex toll switching systems as that disclosed in the application of Gooderham-Jacobitti-Myers-Shipley-Strickler, Serial No. 286,267, filed May 6, 1952. In such a system, when for any reason, an incoming call cannot be extended in the desired direction, the incoming trunk is connected with a signaling trunk which informs the calling operator or subscriber that the call cannot be completed and the present attempt should be abandoned. The number of times that such signaling trunks are used is recorded on traffic registers and an unusually high rate of use for such trunks is a matter of concern.

Failure to complete calls may arise from a number of causes. The most usual cause is a period of heavy traffic when all-trunks-busy and all-channels-busy conditions are likely to occur. In addition, errors in pulsing the wanted designation or a slow response at the distant office may cause the call to be routed to a signaling trunk or a circuit failure in one sender may cause all calls handled by that sender to fail. Since the control equipment is released when the call has been connected to the signaling trunk, and disconnection in response to the signal releases the incoming trunk it is sometimes difficult to determine the cause of such failures.

In accordance with the present invention means is provided for automatically recording the equipment involved and the designation registered whenever a call is to be extended to a signaling trunk.

More specifically, manual means is provided to selectively prepare to make a trouble record when any one of a plurality of conditions arises which requires the use of a signaling trunk.

In addition, the circuits are so arranged that following the recording of such a condition a connection will be completed to the signaling trunk.

More specifically the present invention provides for making trouble records, as desired, when senders time out or when senders call for reorder trunks or pronouncement trunks. For this purpose, separate keys are provided for determining whether or not trouble records are to be made.

A key, common to all of the senders, prepares a circuit which becomes effective if the sender times out, after having received a complete designation, to operate a record-stuck-sender relay which brings about the release of the decoder or marker used in connecton with the call which timed out, if they are still attached, and the calling in of a new decoder to which the instruction is given that a trouble record is to be made. After the trouble record has been made, the decoder-connector functions to prepare for a second trial and the record-stuck-sender relay is released. If the stuck sender holding circuit is effective for this sender, the release of the record-stuck-sender relay releases the decoder-connector and the decoder. If the stuck sender holding circuit is not effective for this sender the release of the record-stuck-sender relay permits the second trial to proceed and indicates to the second trial decoder that the call should be extended to a reorder trunk.

As previously mentioned, one of the causes for routing calls to reorder trunks is faulty keying by operators, for example, at a time when routing instructions have been changed. Under such conditions a record of the digits keyed and the identity of the incoming trunk would indicate the office and the designation causing the recorder routings. For this purpose a comparatively small number of consistent records would be sufficient to permit the traffic people to correct the difficulty and therefore a key is provided which prepares only a part of the decoders for recording requests for a reorder trunk. When this key is operated, as the associated decoders become idle, a record-reorder relay is operated and thereafter each request for a reorder trunk on a first trial basis is recorded. Second trial requests are not recorded.

A further source of trouble during heavy traffic periods is delay in getting a response from the office to which the call is directed. Means has been provided, therefore, whereby, when all of the local senders are busy, the time which the local sender waits for a response at the distant office is shortened and, if the call is not completed within the shortened interval, the call is directed to a pronouncement trunk which gives an oral or visual indication of the probable delay to be expected. Since such calls represent traffic which is meeting with delay, it is desirable to identify that traffic so that proper steps may be taken to minimize such delay in the future. Therefore a key is provided which prepares the decoders to make a trouble record for requests for a pronouncement trunk. This key operates a record-pronouncement relay in the various decoders as they become idle and thereafter whenever a request is received for a pronouncement trunk on a first trial basis a trouble record is made, after which the call is set up on a second trial basis.

These and other features of the invention will be more clearly understood from a consideration of the following description read in connection with the attached drawing in which.

While numerical designations are used in the present disclosure, the functional letter designations such as used in the above-identified Gooderham et al. application have also been shown for convenience in referring to that application.

Figure 5:
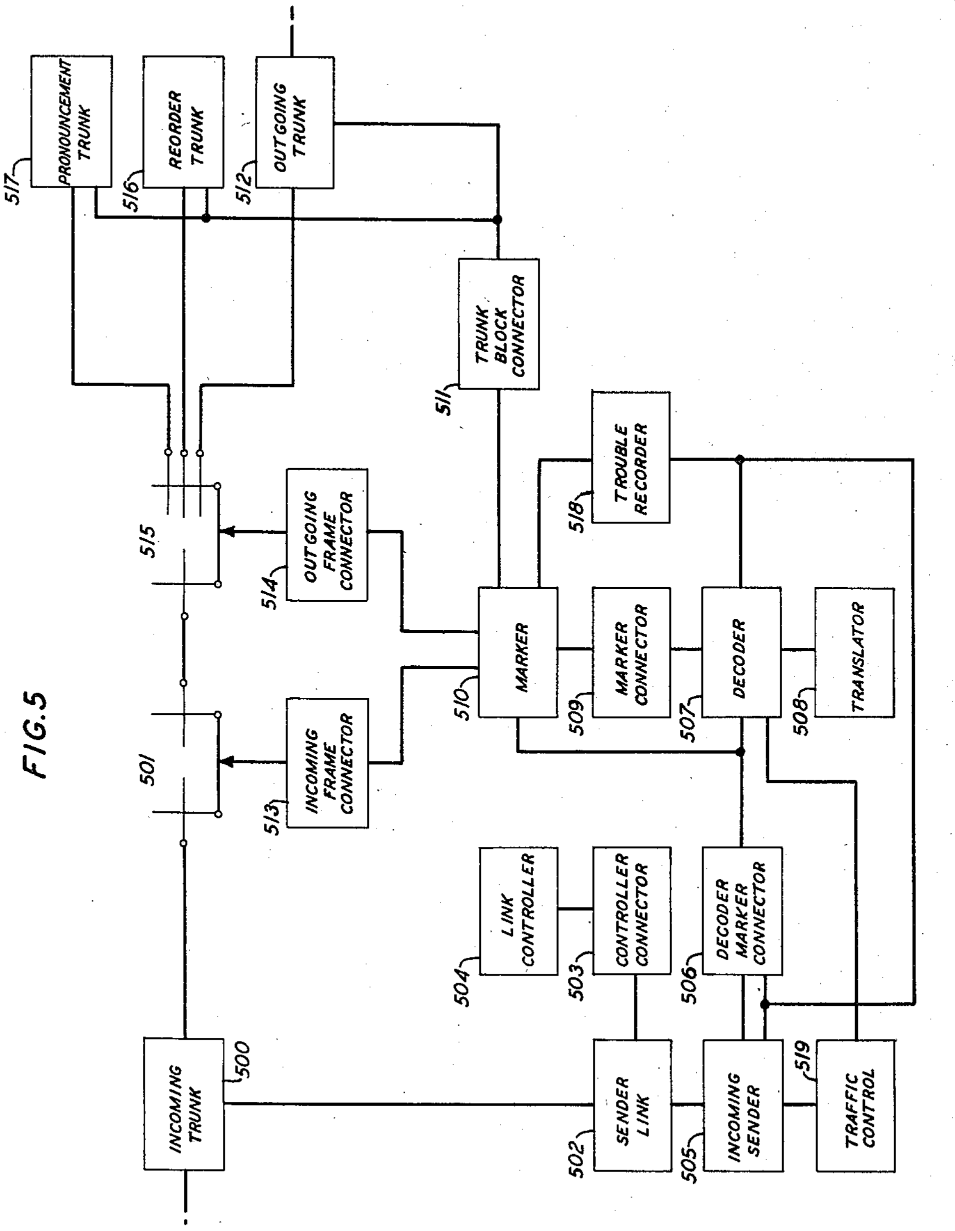
Fig. 5 is a diagrammatic showing of the equipment at a toll switching point in which the present invention may be employed.

Referring first to Fig. 5 a brief description will be given of the operation of the toll control switching arrangement disclosed in the above-identified Gooderham et al. application to which reference is made for a complete description of the operation of the system and also for a showing of the complete circuits, only parts of which are included in the present disclosure.

In this telephone system, a large number of trunks, such as trunk 500, appears in the crossbar switches of incoming switch frames, such as frame 501, and also in the crossbar switches of sender links, such as sender link 502. When a call is directed to trunk 500 the operation of sender link 502 is initiated, which in turn operates controller connector 503 to connect an idle link controller 504 with the sender link 502. The link controller 504 tests for and selects an idle incoming sender, such as sender 505, and operates the sender link switches to connect the incoming trunk 500 with the sender 505, after which the controller connector 503 and link controller 504 are released.

The called line designation is then transmitted over the incoming trunk 500 through the sender link 502 into the sender 505. This designation normally comprises a three-digit area code, a three-digit office code and a four-digit line number although various other types of designations may also be used. When three digits have been registered, the sender 505 operates the decoder marker connector 506 to select an idle decoder, such as decoder 507, and connect the selected decoder with the sender. The decoder immediately connects itself with its home translator 508 and the sender transfers the first three digits through the decoder to the translator. The translator may or may not be able to determine the necessary routing from the three digits supplied. If additional digits are required, the decoder may be released and the same or another decoder seized when sufficient digits have been registered. On this second seizure the same or a different translator may be used to complete the translation. When the translator has made its translation the decoder operates marker connector 509 to select an idle marker, such as marker 510, and connect it with the decoder after which the decoder marker connector 506 is further operated to connect the marker 510 with the sender 505. The necessary information is transmitted to the marker 510 to cause it to operate a trunk block connector, such as connector 511, to connect the marker with the desired group of outgoing trunks, after which a marker selects an idle outgoing trunk, such as trunk 512, and transmits a signal to the decoder and incoming sender to indicate that the trunk has been selected, whereupon the marker connector 509, decoder 507 and translator 508 are released. Under certain conditions the decoder and translator may be released before the marker has selected an idle trunk. Marker 510 then operates the incoming frame connector 513 and the outgoing frame connector 514 and operates the incoming frame switches 501 and the outgoing frame switches 515 to set up a connection between the incoming trunk 500 and the outgoing trunk 512. After this connection has been set up and tested, the marker 510 transmits a release signal to the incoming sender 505 and the decoder marker connector 506 is released, in turn releasing the marker 510, frame connectors 513 and 514 and trunk block connector 511.

Following the release of the marker, the sender awaits an indication that the distant office is ready to receive the designation and all or a part of the registered designation, as determined by the translator, is transmitted over the setup connection to the distant office after which the talking path through the incoming trunk 500 is established and the sender link 502 and incoming sender 505 are released.

In addition to the outgoing trunk, such as trunk 512, the toll office is provided with a number of trunks which provide characteristic signals for transmission to the originating office. Such trunks include reorder trunks, such as trunk 516, which provide a tone and flashing signal and trunks, such as trunk 517, which provide an oral pronouncement. If the marker cannot find an idle trunk or, having selected an idle trunk, cannot find an idle channel connecting with that trunk, it is arranged to automatically set up the connection to a reorder trunk, such as trunk 516. This selection of a reorder trunk is made in response to a signal from the translator or decoder connector and may be received only after a plurality of attempts have been made to find an idle trunk or an idle channel.

The senders are equipped with timing means which is effective if the sender is not released before a predetermined time expires to transmit a signal to the decoder that a reorder trunk is required. They are also provided with means which is effective under an all-senders-busy condition to call for a routing to a pronouncement trunk, such as trunk 517, if there is an undue delay in obtaining response from the distant office. As will be described hereinafter, if the number of calls for such trunks appears to be excessive, means is provided for causing the decoder to operate the trouble recorder 518 before calling in a marker to set up the requested connection.

The traffic control means 519 includes keys and other equipment for controlling the recording of calls for special trunks and other features which will be described in detail hereinafter.

Figure 1:
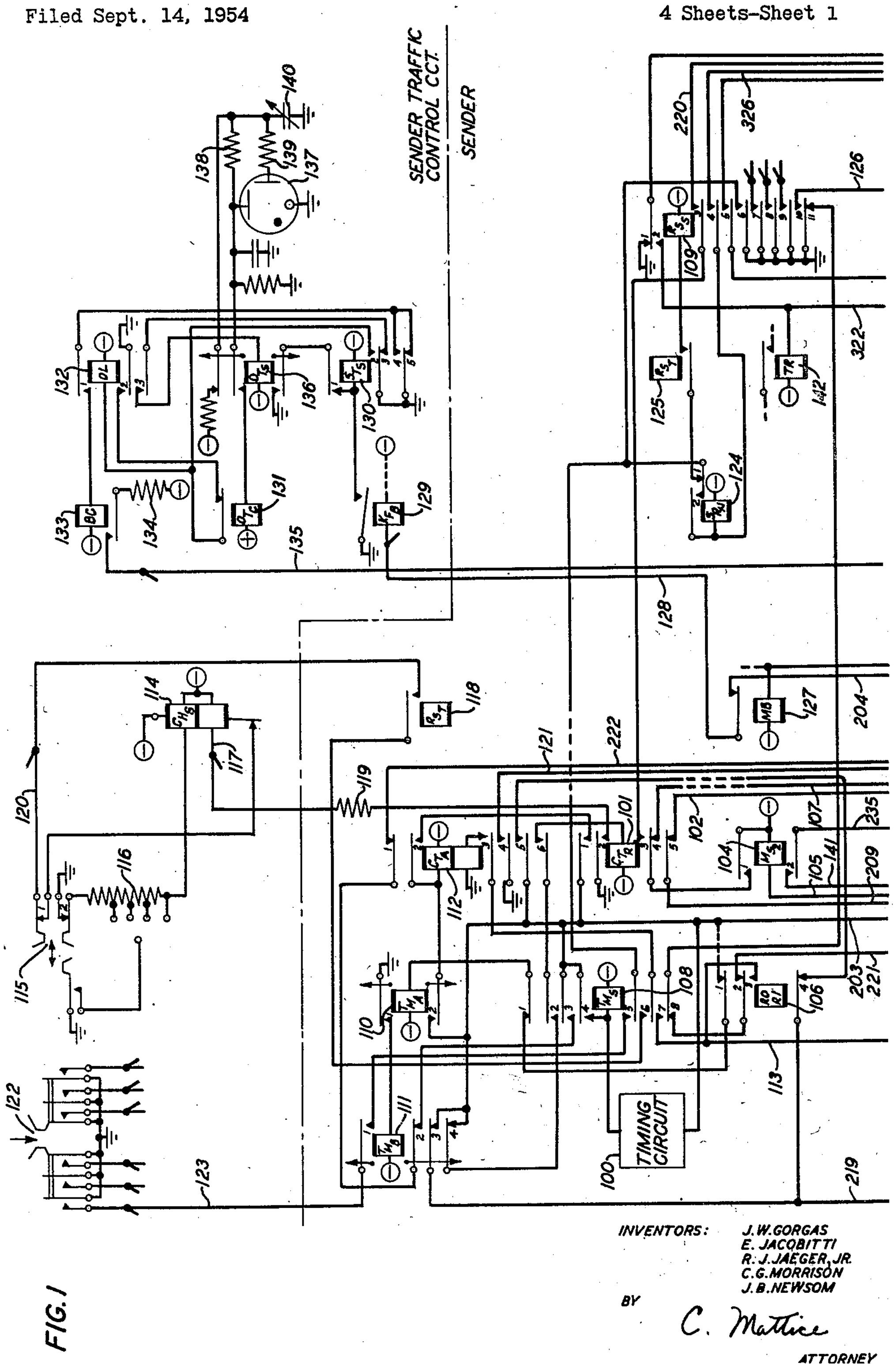
Fig. 1 shows a part of an incoming toll sender including the timing means.
Figure 2:
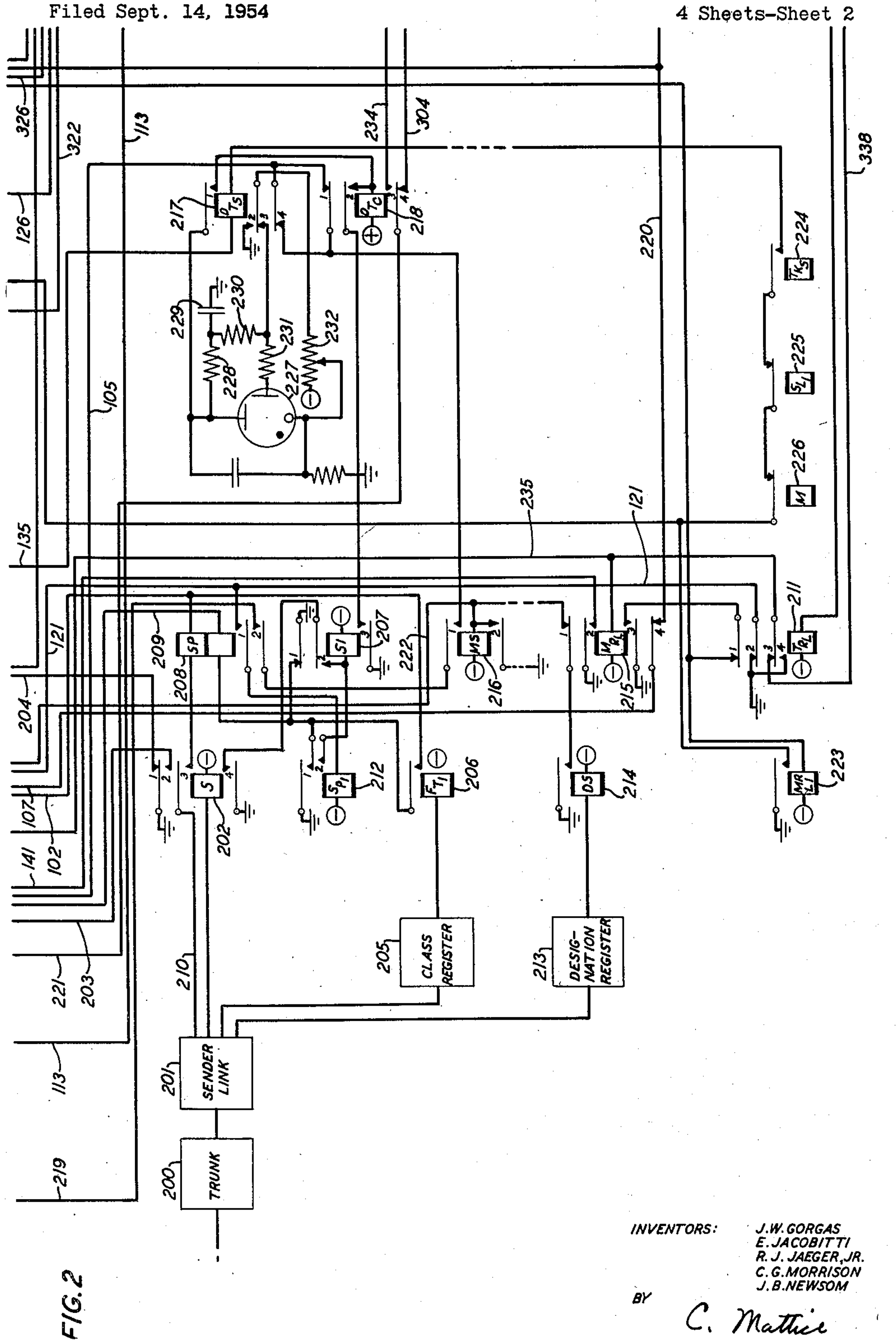
Fig. 2 shows in skeleton form a trunk circuit sender link and an additional part of an incoming toll sender.
Figures 3, 4:
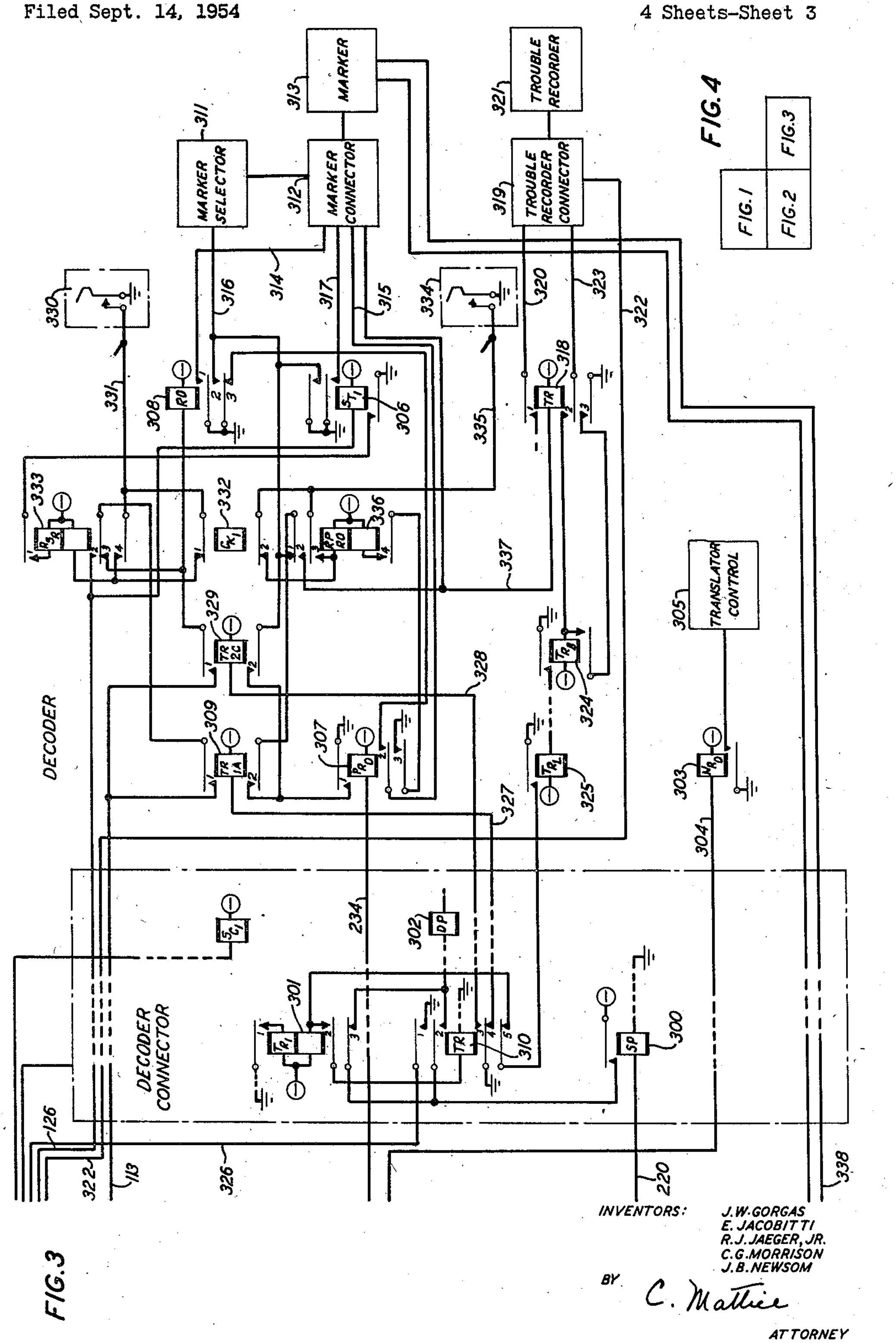
Fig. 3 shows a decoder connector and a part of a decoder and in skeleton form a marker, a trouble recorder and the associated connectors.
Fig. 4 shows the manner in which Figs. 1 to 3 should be arranged.

Referring now to Figs. 1 to 3, inclusive, when the incoming trunk 200 has been connected through the sender link 201 to the sender, relay 202 is operated, connecting ground to conductor 203 to initiate the operation of the timing circuit indicated by the box 100 and disconnecting ground from conductor 204 to mark the sender busy. As soon as relay 202 is operated, a circuit is closed from ground over contact 1 of relay 207, lower winding of relay 208, conductor 209, contact 5 of relay 101, conductor 102, upper winding of relay 208, contact 3 of relay 202, conductor 210 through the sender link 201 to battery through the winding of a trunk splitting relay in the trunk 200. Relay 208 operates in this circuit, as an indication that the circuit is complete, and closes a circuit from ground over contact 2 of relay 211, conductor 121, contact 1 of relay 208 to battery through the winding of relay 212. Relay 212 operates in this circuit, connecting ground over its contact 1 to the lower winding of relay 208 and over its contacts 1 and 2 to battery through the winding of relay 207. Relay 207 operates, opens the original operating circuit for relay 208 and locks over its contact 2 to ground over contact 4 of relay 202.

As soon as the trunk circuit is connected with the sender the class register 205 is operated in accordance with the class of the incoming trunk, operating relay 206 to indicate that the class has been registered. With relay 206 operated, ground is connected over contact 1 of relay 212 and the contact of relay 206 to conductor 102 in shunt of the lower winding of relay 208, reducing the resistance in the circuit of the trunk splitting relay sufficiently to cause the latter relay to operate. With the trunk splitting relay operated, the incoming conductors of the trunk are extended to the designation registering equipment 213 while the outgoing conductors are extended to the supervision control and designation transmitting circuits (not shown).

When relay 202 operates to connect ground to conductor 203, it initiates the operation of the timing circuit 100 at the same time completing a circuit over contact 1 of relay 106, contact 1 of relay 108 to battery through the winding of relay 110. Relay 110 operates in this circuit, in turn operating relay 111 and, in addition, closes a circuit from ground on conductor 203 over contact 2 of relay 110 to battery through the upper winding of relay 112 operating the latter relay.

When the first three digits have been registered in the designation registering equipment 213, relay 214 is operated, closing a circuit from ground over its contact, contact 1 of marker release relay 215 to battery through the marker start relay 216. Relay 216 operates and locks over its contact 2 to off-normal ground. With relay 216 operated, a circuit is closed from battery through the winding relay 104, conductor 105, over contact 4 of relay 217 or contact 1 of relay 218, contact 1 of relay 216, contact 2 of relay 208, conductor 219, contact 4 of relay 106, through other equipment not shown, over contact 5 of relay 112 to ground on conductor 203. Relay 104 operates in this circuit and connects battery over its contact 1 and contact 4 of relay 101, conductor 107, contact 4 of relay 215, conductor 220 to ground through the winding of sender preference relay 300 in the decoder connector. Relay 300 connects battery over its contact and contact 3 of relay 301 to the winding of the decoder preference relay 302. As completely described in the above-identified Gooderham et al. application, relays 300 and 302 function to operate a number of multicontact relays to set up a plurality of circuits connecting the sender with the decoder. For a normal call, the not-reorder relay 303 is operated over conductor 304 extended through the decoder connector, contact 4 of relay 218, conductor 221, contact 2 of relay 106, contact 8 of relay 108 to ground at contact 11 of relay 109. Relay 303 initiates the operation of the translator control equipment 305 and the completion of the desired connection.

When the marker has completed its operations, it connects ground to conductor 338 completing a circuit over contact 3 of relay 211 to battery through the winding of marker release relay 215. Relay 215 operates in this circuit and locks over conductor 235, contact 2 of relay 104, conductor 141 to ground at contact 2 of relay 215. Relay 215 closes a circuit from ground over its contact 3, contact 1 of relay 211 to battery through the winding of relay 223 operating the latter relay. At its contact 4, relay 215 also opens the circuit of relay 300. Relays 215 and 223 initiate the further operation of the sender.

As above described, the operation of relay 202 initiates the operation of the timing circuit 100. This circuit is recycled at different stages of the operation of the sender as described in the above-identified Gooderham et al. application and is ordinarily restored to normal by the release of relay 202 at the completion of the sender operations.

If, however, the timing cycle is completed, a circuit is closed for relay 108 which operates, locking over its contact 4 to conductor 203. Relay 108, in operating, opens the circuit of relay 110 which releases slowly in turn releasing relay 111, which also releases slowly, and opening the circuit of relay 112.

If the sender has progressed to the point where the decoder connector has operated, the release of relay 112 opens the circuit of relay 104 to bring about the release of the decoder or the marker. When slow-to-release relay 111 closes its back contacts, a new circuit is closed for operating relay 104 which may be traced as above to conductor 219 and thence over contact 3 of relay 111 to ground on conductor 203 so that a new decoder will be called in. With relay 108 operated, ground is connected over contact 11 of relay 109, contact 7 of relay 108, and conductor 113 leading to the decoder connector to operate reorder relay 308 in the decoder to indicate that a connection with a reorder trunk is required.

If the sender times out before a decoder has been called in, a circuit is closed for operating relay 216 which may be traced from battery through the winding of that relay, conductor 222, contact 1 of relay 112, contact 2 of relay 111, contact 3 of relay 108 to ground on conductor 203. With relay 216 operated, the above-traced circuit for relay 104 is closed and a decoder is called in to control the establishment of a connection to a reorder trunk.

A request for a reorder trunk may also occur without waiting for time-out as a result of operators' errors which cause the operation of relay 106. Relay 106 opens the circuit of relay 110, causing that relay as well as relays 111 and 112 to release in turn to release the decoder if one is in use and call in a new decoder. The circuit for grounding the reorder conductor 113 is closed over contact 3 of relay 106, contact 8 of relay 108 and contact 11 of relay 109.

Whenever the sender timing circuit functions a brief tone and lamp signal is given, but since the sender ordinarily returns to normal after the call in progress has been completed to a reorder trunk, the cause of the time-out may be difficult to determine. Therefore, it has been customary in the past to provide keys individual to the senders to prevent the associated sender from returning to normal after a stuck sender condition. Another previous arrangement employs a chain circuit extending through all senders whereby the release of the first sender in the group to time out is prevented, while senders which time out subsequently are permitted to restore to normal.

In the present circuit means is provided to permit holding no senders, one sender or a predetermined plurality of senders. This means comprises relay 114, key 115 and resistance 116 which are common to all of the senders, being connected in multiple over conductors 117 and 120 to all senders. In the previous description the effect of the holding circuit was ignored, but the resulting action was the same as that which would take place prior to the complete registration of a designation or when key 115 is in its right position.

With key 115 in its central position as shown, if the timing circuit 100 completes its operation and operates relay 108 after a complete designation has been registered as indicated by the operation of relay 118, a circuit is closed from battery over the normally closed contact of relay 114, contact 1 of key 115, conductor 120, contact of relay 118, contact 6 of relay 108, contact 3 and lower winding of relay 112 to ground, preventing the release of relay 112 when its operating circuit is opened by the release of relay 110. With relay 112 held operated, when relay 111 subsequently releases, a circuit is closed from battery through the winding of relay 101, contact 6 of relay 112, contact 2 of relay 108, contact 4 of relay 111 to ground over conductor 203. Relay 101 operates in this circuit and closes a circuit from ground over its contact 2 through resistance 119, conductor 117 and thence to battery through the lower winding of relay 114. Relay 114 is a polarized relay having a biasing circuit extending from battery through its upper winding through resistance 116 to ground over contact 2 of relay 115. This biasing circuit energizes the upper winding of relay 114 only sufficiently so that the completion of a circuit through one resistance 119 will cause relay 114 to operate and disconnect battery from conductor 120. Therefore in all senders which time out subsequently there will be no holding circuit for relay 112 and the sender will release automatically.

Relay 101, when operated, closes an additional holding circuit for relay 112 which may be traced from battery through the upper winding of relay 112, contact 2 of relay 112, contact 1 of relay 101 to ground on conductor 203. With relay 112 held operated, ground over contact 4 of relay 112 is connected over conductor 121, contact 1 of relay 208 to battery through the winding of relay 212 to hold relays 212 and 208 operated and to in turn hold the link circuit and the trunk to which the sender is attached.

Resistance 116 is provided with a number of taps which may be cross-connected to the left contact of key 115. Under this condition, when key 115 is moved into its left position, ground is connected through only a portion of resistance 116 and relay 114 is so biased that it will not operate until a plurality of relays, like relay 101, have operated to connect a corresponding number of resistances 119 in parallel to the operating winding of relay 114. The tap on resistance 116 selected for cross-connection to key 115 determines the number of senders which are to be held.

This arrangement is a great improvement over the former arrangement since it permits the maintenance force to control the number of senders held in accordance with traffic conditions and with the maintenance force available. Under heavy traffic conditions key 115 may be set to hold none of the senders; when the maintenance force is small, key 115 may be set so that only a single sender is held at a time; when a maximum maintenance force is available key 115 may be set so that a plurality of senders may be held thereby improving the chances of detecting and correcting sender and outgoing trunk troubles.

At times when it is inconvenient to make a direct check on a sender which times out, it is desirable to make a record of the equipment involved and the designation registered and permit the sender to return to service. For this purpose key 122 is provided which, when operated, connects ground to a conductor, like conductor 123, leading to each sender. If conductor 123 is grounded and the timing circuit 100 causes relay 108 to operate, a circuit is closed following the operation of relay 108 and prior to the release of relay 111 which may be traced from ground on conductor 123, contact 1 of relay 111, contact 5 of relay 108, contact 1 of relay 124, contact of relay 125 to battery through the winding of relay 109. Relay 125 is either the same relay as relay 118 or is operated at the same time and also indicates that a complete designation has been registered. Relay 109 operates in this circuit and closes a locking circuit for itself from battery through its winding over the contact of relay 125, contact 1 of relay 124 to ground at contact 6 of relay 109. In addition, at its contacts 7, 8 and 9, relay 109 places holding ground on a number of conductors to insure that the associated relays remain operated until after a record has been made.

The operation of relay 109 results in the calling in of a decoder. If key 115 is in its right position so that the sender is not set to be held, the release of relay 112 opens the circuit of relay 104 to dismiss the decoder if attached, while the subsequent release of relay 111 reoperates relay 104 to reclose the decoder start circuit. If the sender is to be held, the operation of relay 101 opens the decoder start circuit, which is then reclosed over contact 3 of relay 101 and contact 3 of relay 109. With relay 109 operated, ground is connected over contact 10 of relay 109 to conductor 126 and through the decoder connector to the winding of relay 306 to indicate to the decoder that a stuck sender trouble record is to be made.

The sender is also arranged to request a connection with a trunk providing an oral pronouncement when an all-senders-busy condition exists and there is an undue delay in receiving a response from the distant office. As previously stated, as long as the sender is idle, ground is connected over contact 1 of relay 202 to conductor 204 which further extends over the contact of make-busy relay 127, conductor 128, to the sender traffic control circuit where it completes a circuit to battery through the winding of relay 129. All similar senders connect ground to conductor 128 when they are idle, so that relay 129 remains operated as long as any sender is idle. When all of the senders become busy, ground is removed from conductor 128 and relay 129 releases, completing an obvious circuit for relay 130. Relay 130 operates and closes a circuit from ground over its contact 2 to battery through the winding of relay 132. Relay 132 operates and locks over the normally closed contact of relay 131 to ground at contact 2 of relay 132. With relays 130 and 132 operated, a circuit is closed from ground over contact 4 of relay 130, contact 1 of relay 132 to battery through the winding of relay 133. Relay 133 connects battery through resistance 134 to conductor 135 which extends to the winding of relay 217 in each sender.

When a sender becomes idle, relay 129 is reoperated releasing relay 130. However, the circuit of relay 133 is reclosed at the back contact 5 of relay 130 so that relay 133 is not released during brief intervals when a sender becomes idle and is immediately reseized. With relay 132 held operated, when relay 130 releases, it closes a circuit from battery through the winding of relay 136, contact 3 of relay 132 to ground at contact 3 of relay 130. Relay 136, in operating, prepares a timing circuit including tube 137 by connecting +130-volt battery through the winding of relay 131 to the main anode of tube 137 and through resistance 138 to condenser 140, condenser 140 being connected through resistance 139 to the control anode of tube 137. If relay 130 is immediately reoperated, relay 136, which is slow to release, locks relay 130 during its releasing interval to minimize the number of brief operations of the two relays. When relay 130 remains released for an interval of twenty to thirty seconds as determined by the capacity of condenser 140, condenser 140 is charged to the breakdown potential of tube 137, causing the tube to break down, and relay 131 to operate across the main gap of tube 137, opening the locking circuit of relay 132 and releasing relay 133 to remove battery from conductor 135.

As set forth in detail in the above-identified Gooderham et al. application, when a marker has selected an outgoing trunk it operates a trunk selected relay, such as relay 224, and when the connection between the incoming trunk and the selected outgoing trunk has been set up and tested, ground is connected to conductor 338 to operate relay 215 as above described. With relay 215 operated, a circuit is closed from ground over contact 3 of relay 215 and contact 1 of relay 211 to battery through the winding of relay 223. At this time the sender sets up a circuit extending to the outgoing trunk, waiting for a signal that the sender in the distant office is ready to receive the designation. When the distant office is ready, a signal is transmitted which causes the operation of relay 225. If the distant office is a manual office, in which case no designation will be transmitted, relay 226 is operated by the marker. During the interval between the operation of relay 223, to indicate that the marker has completed its functions, and the operation of relay 225 to indicate that the distant sender is ready to receive the designation, a circuit is closed from ground over the contact of relay 223, back contact of relay 226, back contact of relay 225, front contact of relay 224, winding of relay 217 to conductor 135. If all of the senders are busy, battery will be connected to conductor 135 as above described, causing relay 217 to operate. With relay 217 operated, +130-volt battery is connected through the winding of relay 218, contact 1 of relay 217 to the main anode of tube 227 and through resistance 228 to condenser 229 which is connected through resistances 230 and 231 to the control anode of tube 227. At its contact 2, relay 217 connects ground to battery through the voltage divider 232 which is connected to the cathode of tube 227. By means of the voltage divider 232, the potential on the cathode of tube 227 may be varied to control the time required for condenser 229 to reach the breakdown potential of tube 227. When this occurs, relay 218 operates across the main gap of tube 227, locking over its contact 2 to ground at contact 3 of relay 207. With relays 217 and 218 both operated, the operating circuit for relay 104 is opened and that relay releases, in turn releasing relays 215 and 223 and any other relays held under the control of relays 215 and 223. The release of relay 223 opens the circuit of relay 217 causing that relay to release and reclose the operating circuit for relay 104 to call in a new decoder. With relay 218 operated and locked, a circuit is closed from ground over contact 11 of relay 109, contact 8 of relay 108, contact 2 of relay 106, conductor 221, contact 3 of relay 218 to conductor 234 which extends through the decoder connector to the winding of relay 307 in the selected decoder to request a connection to a trunk providing an oral pronouncement.

The marker, during the setting up of the connection to a pronouncement trunk, releases the previous connection.

Referring now to Fig. 3, it will be remembered that for a normal call relay 303 is operated, if the sender times out recorder relay 308 is operated, if it is desired to make a trouble record in connection with a stuck sender relay 306 is operated, and if the call is to be routed to a trunk providing an oral pronouncement relay 307 is operated, As completely described in the Gooderham et al. application, the operation of relay 303 initiates the operation of the translator control equipment indicated by the box 305, the decoder, marker and sender functioning as a result of the operation of the translator to complete the desired connection. If one of the relays 306, 307 or 308 is operated, no translation is required.

With relay 306 operated, ground is connected to conductor 316 to cause the marker selector circuit 311 to operate the proper marker connector 312 and select on idle marker 313. Relay 306 also connects ground to conductor 317 leading through the marker connector 312 to the marker to indicate to the marker that a trouble record is required. The marker, in response to this indication, connects ground to conductor 337 operating relay 318 which in turn operates the trouble recorder connector 319 over conductor 320 causing the trouble recorder 321 to be connected with the decoder and the marker and record whatever information has been set up in these circuits. In addition, the trouble recorder grounds conductor 322 which extends through the decoder connector to battery through the winding of relay 142 in the sender to close circuits for transmitting additional information from the sender to the trouble recorder. This information is in part that which was transmitted from the marker to the sender and the grounding of conductor 417 also operates relays in the marker to open the leads over which this information was transmitted so that only the information locked in the sender will be recorded. The circuits over which the information is transmitted from the sender, decoder and marker to the trouble recorder have not been shown but are disclosed in the above-identified Gooderham et al. application.

When the record has been completed, ground is connected to conductor 323 which extends over contact 2 of relay 318 to battery through the winding of relay 324 operating the latter relay. Relay 324 locks under the control of relay 318 and operates trouble release relay 325. Relay 325, in operating, closes a circuit from ground over its contact, contact 5 of relay 310 in the decoder connector, lower winding of relay 301 to battery. Relay 301 operates, locks through its upper winding and extends its operating circuit over its contact 2 to ground through the winding of relay 310. At its contact 3, relay 301 opens the circuit of the decoder preference relay 302 causing the decoder to release, thereby opening the circuit for relay 301. Relay 310 now operates in series with the lower winding of relay 301 and closes a new circuit for a decoder preference relay, such as relay 302. With relay 310 operated, ground is connected over its contact 1 and conductor 326, contact 4 of relay 109 to battery through the winding of relay 124. Relay 124 operates and locks over its contact 2 to ground at contact 6 of relay 109, thereby opening the operating circuit for relay 109 which releases, in turn releasing relay 124. If the stuck sender is in condition to be held, the release of relay 109 opens the start circuit of the decoder connector, releasing the decoder connector, the decoder and all of the attached circuits and leaving the sender held. If the sender is not in a condition to be held, the start circuit is maintained, as previously traced, over contact 4 of relay 101 and the release of relay 109 connects ground over its contact 11, as previously traced, to conductor 113 to cause the call to be routed to a reorder trunk.

It will be noted that, with relay 310 normal, ground is connected over contact 4 of relay 310 to conductor 327, operating the first trial relay 309 in the attached decoder. With relay 310 operated, ground is connected to conductor 328, and as soon as a new decoder has been seized, second trial relay 329 is operated.

In order to make a record of the equipment involved in a request for a reorder trunk, key 330 is provided which, when operated, connects ground to conductor 331 leading to one, or in multiple to a plurality of decoders. If the decoder is idle, as indicated by the non-operation of relay 332, ground on conductor 331 is extended over contact 1 of relay 322 to battery through the lower winding of relay 333, operating relay 333 which locks over its contact 4 under the control of key 330. A supplementary locking circuit is provided extending from battery through the upper winding of relay 333 and over its contact 1 to ground at contact 3 of relay 306 to prevent the release of relay 333 if key 330 is restored during the time that a trouble record is being made.

The circuit for operating relay 308 differs according as first or second trial is being made and according as relay 333 is or is not operated. For a first trial with relay 333 normal, ground on conductor 113 extends over contact 1 of first trial relay 309 and contact 3 of relay 333 to battery through the winding of reorder relay 308. Relay 308 grounds conductor 316 to operate the marker selector 311 and the marker connector 312 and cause the connection of the decoder with a marker 313. It also connects ground to conductor 314 to indicate to the marker that the call is to be set up to a reorder trunk. In the case of a second trial with relay 329 operated, ground on conductor 113 is extended over contact 1 of relay 329 directly to the winding of relay 308 to cause the connection to be set up irrespective of relay 333. However, if relay 333 is operated as above described and conductor 113 is grounded to request a connection to a reorder trunk on a first trial, a circuit will be closed from ground on conductor 113, contact 1 of relay 309, contact 2 of relay 333 to battery through the winding of relay 306 to cause a trouble record to be made as above described. When the record has been made and relay 310 is operated to cause a second trial to be made, relay 308 is operated and the connection is set up to a reorder trunk.

As in the case of the reorder trunks, manually controlled means is provided to cause a trouble record to be made when a request is made for a pronouncement trunk. Key 334, when operated, connects ground to conductor 335 which extends in multiple to all decoders. When the decoder is idle, as indicated by the non-operation of relay 332, ground on conductor 335 is extended over contact 2 of relay 332 to battery through the upper winding of relay 336. Relay 336 operates and locks over its contact 3 to conductor 335 and closes a supplementary locking circuit for itself from battery through its lower winding and over its contact 4 to ground at contact 3 of relay 307 to prevent its release should key 334 be restored during the time that a request for a pronouncement trunk is being handled by the decoder.

On a first trial, with relay 336 normal, the operation of relay 307 closes a circuit from ground over contact 1 of relay 307, contact 2 of relay 309, contact 1 of relay 336 to conductor 316 to cause the marker selector 311 and marker connector 312 to seize an idle marker 313. Relay 307 also closes a circuit from ground over contact 3 of relay 308, contact 2 of relay 307 to conductor 315 leading through the marker connector 312 to the marker 313 to inform the marker that a connection to a pronouncement trunk is required. On a second trial, ground over contact 1 of relay 307 is extended over contact 2 of relay 329 directly to conductor 316 to call in a marker irrespective of the operation or non-operation of relay 336.

If relay 336 is operated, and the sender operates relay 307 on a first trial, a circuit is closed from ground over contact 1 of relay 307, contact 2 of relay 309, contact 2 of relay 336, conductor 337 to battery through the winding of relay 318. Relay 318 immediately calls in the trouble recorder and a record is made of the equipment and designation involved. As previously described, the completion of the trouble record operates relay 324, in turn operating relay 325 to give a trouble release to the decoder by operating relay 301. When relay 310 operates, following the release of the first decoder and the connection with another decoder, the second trial relay 329 is operated and the marker is called in to set up the connection to a pronouncement trunk.

What is claimed is:

1. In a telephone system, incoming trunks, outgoing trunks, local signaling trunks, switches for connecting said incoming trunks to said outgoing trunks or to said local signaling trunks, senders for registering designations received over said incoming trunks, control equipment for controlling the operation of said switches, a trouble recorder, means for transmitting registered designations from said senders to said control equipment to cause said control equipment to operate said switches to connect an incoming trunk with an outgoing trunk, means for transmitting special trunk request signals from said senders to said control equipment, means in said control equipment responsive to said special signals to operate said trouble recorder, and means responsive to the operaion of said trouble recorder to cause said control equipment to operate said switches to connect said incoming trunk with one of said local signaling trunks indicated by said trunk request signal.

2. In a telephone system, incoming trunks, outgoing trunks, local signaling trunks, switches for connecting said incoming trunks to said outgoing trunks or to said local signaling trunks, senders for registering designations received over said incoming trunks, control equipment for controlling the operation of said switches, a trouble recorder, means for transmitting registered designations from said senders to said control equipment to cause said control equipment to to operate said switches to connect an incoming trunk with an outgoing trunk, means for transmitting special trunk request signals from said senders to said control equipment, means in said control equipment normally responsive to said special signals to cause said control equipment to operate said switches to connect said incoming trunk with one of said local signaling trunks, manually controlled means for rendering said control equipment responsive to said special signals to operate said trouble recorder, and means responsive to the operation of said trouble recorder to cause said control equipment to operate said switches to connect said incoming trunk with one of said local signaling trunks indicated by said trunk request signal.

3. In a telephone system, incoming trunks, outgoing trunks, local signaling trunks, switches for connecting said incoming trunks to said outgoing trunks or to said local signaling trunks, senders for registering designations received over said incoming trunks, control equipment for controlling the operation of said switches, a trouble recorder, means for transmitting registered designations from said senders to said control equipment to cause said control equipment to operate said switches to connect an incoming trunk with an outgoing trunk, means for transmitting special trunk request signals from said senders to said control equipment, means in said control equipment normally responsive to said special signals to cause said control equipment to operate said switches to connect said incoming trunk with one of said local signaling trunks, manually controlled means for rendering said control equipment responsive to said special signals to operate said trouble recorder, means responsive to the operation of said trouble recorder to cause the release and reoperation of said control equipment, and means responsive to the reoperation of said control equipment to cause said control equipment to operate said switches to connect said incoming trunk with one of said local signaling trunks indicated by said trunk request signal.

4. In a telephone system, incoming trunks, outgoing trunks, local signaling trunks, switches for connecting said incoming trunks to said outgoing trunks or to said local signaling trunks, senders for registering designations received over said incoming trunks, control equipment common to said senders for controlling the operation of said switches, means to connect said senders with said control equipment, a trouble recorder, means for transmitting registered designations from said senders to said control equipment to cause said control equipment to operate said switches to connect an incoming trunk with an outgoing trunk, means for transmitting special trunk request signals from said senders to said control equipment, means in said control equipment normally responsive to said special signals to cause said control equipment to operate said switches to connect said incoming trunk with one of said local signaling trunks, manually controlled means for rendering said control equipment responsive to said special signals to operate said trouble recorder, means responsive to the operation of said trouble recorder to cause the release and reoperation of said connecting means to restore and reoperate said control equipment, and mean responsive to the reoperation of said connecting means to cause said control equipment to operate said switches to connect said incoming trunk with one of said local signaling trunks indicated by said trunk request signal.

5. In a telephone system, incoming trunks, outgoing trunks, local signaling trunks, switches for connecting said incoming trunks to said outgoing trunks or to said local signaling trunks, senders for registering designations received over said incoming trunks, control equipment common to said senders for controlling the operation of said switches, means to connect said senders with said control equipment a first trial relay in said control equipment, means responsive to a first operation of said connecting means to operate said first trial relay, a trouble recorder, means for transmitting registered designations from said senders to said control equipment to cause said control equipment to operate said switches to connect an incoming trunk with an outgoing trunk, means for transmitting special trunk request signals from said senders to said control equipment, means in said control equipment normally responsive to said special signals to cause said control equipment to operate said switches to connect said incoming trunk with one of said local signaling trunks, manually controlled means for preparing said control equipment for operating said trouble recorder, means under the joint control of said first trial relay and said manually controlled means for rendering said control equipment responsive to said special signals to operate said trouble recorder, means responsive to the operation of said trouble recorder to release and reoperate said connecting means to restore and reoperate said control equipment, a second trial relay in said control equipment means responsive to the reoperation of said connecting means to operate said second trial relay and means under the control of said second trial relay to cause said control equipment to operate said switches to connect said incoming trunk with one of said local signaling trunks indicated by said trunk request signal.

6. In a telephone system incoming trunks, outgoing trunks, local signaling trunks, switches for connecting said incoming trunks to said outgoing trunks or to said local signaling trunks, senders, means for connecting one of said senders to an incoming trunk, means in said sender for registering designations received over said incoming trunk, control equipment for controlling the operation of said switches, means for connecting said sender with said control equipment, means for transmitting registered designations from said sender to said control equipment to cause said control equipment to operate said switches to connect said one incoming trunk with an outgoing trunk, means responsive to the connection of said incoming trunk with said outgoing trunk to disconnect said sender from said incoming trunk, timing means in said sender, means responsive to the connection of said incoming trunk with said sender to initiate the operation of said timing means, means responsive to the disconnection of said sender from said incoming trunk to stop the operation of said timing means, a time-out relay, means under the control of said timing means after said timing means has measured a predetermined time interval, prior to the disconnection of said sender, to operate said time-out relay, means normally under the control of said time-out relay to transmit a first special trunk request signal to said control equipment to cause said control equipment to connect said incoming trunk with one of said local signaling trunks and key controlled means common to said senders to cause said time-out relay to transmit a different signal to said control equipment.

7. In a telephone system incoming trunks, outgoing trunks, local signaling trunks, switches for connecting said incoming trunks to said outgoing trunks or to said local signaling trunks, senders, means for connecting one of said senders to an incoming trunk, means in said sender for registering designations received over said incoming trunk, control equipment for controlling the operation of said switches, means for connecting said sender with said control equipment, means for transmitting registered designations from said sender to said control equipment to cause said control equipment to operate said switches to connect said one incoming trunk with an outgoing trunk, means responsive to the connection of said incoming trunk with said outgoing trunk to disconnect said sender from said incoming trunk, timing means in said sender, means responsive to the connection of said incoming trunk with said sender to initiate the operation of said timing means, means responsive to the disconnection of said sender from said incoming trunk to stop the operation of said timing means, a time-out relay, means under the control of said timing means after said timing means has measured a predetermined time interval, prior to the disconnection of said sender, to operate said time-out relay, means normally under the control of said time-out relay to transmit a first signal to said control equipment, means in said control equipment responsive to said first signal to cause said signal control equipment to connect said incoming trunk with one of said local signaling trunks, key controlled means common to said senders to cause said time-out relay to transmit a different signal to said control equipment, a trouble recorder and means in said control equipment responsive to said different signal to operate said trouble recorder.

8. In a telephone system incoming trunks, outgoing trunks, local signaling trunks, switches for connecting said incoming trunks to said outgoing trunks or to said local signaling trunks, senders, means for connecting one of said senders to an incoming trunk, means in said sender for registering designations received over said incoming trunk, control equipment for controlling the operation of said switches, means for connecting said sender with said control equipment, means for transmitting registered designations from said sender to said control equipment to cause said control equipment to operate said switches to connect said one incoming trunk with an outgoing trunk, means responsive to the connection of said incoming trunk with said outgoing trunk to disconnect said sender from said incoming trunk, timing means in said sender, means responsive to the connection of said incoming trunk with said sender to initiate the operation of said timing means, means responsive to the disconnection of said sender from said incoming trunk to stop the operation of said timing means, a time-out relay, means under the control of said timing means after said means has measured a predetermined time interval, prior to the disconnection of said sender, to operate said time-out relay, means normally under the control of said time-out relay to transmit a first signal to said control equipment, means in said control equipment responsive to said first signal to cause said control equipment to connect said incoming trunk with one of said local signaling trunks, key controlled means common to said senders to cause said time-out relay to transmit a different signal to said control equipment, a trouble recorder, means in said control equipment responsive to said different signal to operate said trouble recorder and means responsive to the operation of said trouble recorder to cause said sender to transmit said first signal to said control equipment.

9. In a telephone system incoming trunks, outgoing trunks, local signaling trunks, switches for connecting said incoming trunks to said outgoing trunks or to said local signaling trunks, senders, means for connecting one of said senders to an incoming trunk, means in said sender for registering designations received over said incoming trunk, control equipment for controlling the operation of said switches, means for connecting said sender with said control equipment, means for transmitting registered designations from said sender to said control equipment to cause said control equipment to operate said switches to connect said one incoming trunk with an outgoing trunk, means responsive to the connection of said incoming trunk with said outgoing trunk to disconnect said sender from said incoming trunk, timing means in said sender, means responsive to the connection of said incoming trunk with said sender to initiate the operation of said timing means, means responsive to the disconnection of said sender from said incoming trunk to stop the operation of said timing means, a time-out relay, means under the control of said timing means after said timing means has measured a predetermined time interval, prior to the disconnection of said sender, to operate said time-out relay, means normally under the control of said time-out relay to transmit a first signal to said control equipment, means in said control equipment responsive to said first signal to cause said control equipment to connect said incoming trunk with one of said local signaling trunks, key controlled means common to said senders to cause said time-out relay to transmit a different signal to said control equipment, a trouble recorder, means in said control equipment responsive to said different signal to operate said trouble recorder, means responsive to the operation of said trouble recorder to cause said sender to transmit said first signal to said control equipment, a holding relay in said sender, means common to said senders to operate said holding relay and means responsive to the operation of said holding relay to prevent the transmission of said first signal to said control equipment responsive to the operation of said trouble recorder.

10. In a telephone system incoming trunks, outgoing trunks, local signaling trunks, switches for connecting said incoming trunks to said outgoing trunks or to said local signaling trunks, senders, means for connecting one of said senders to an incoming trunk, means in said sender for registering designations received over said incoming trunk, control equipment for controlling the operation of said switches, means for connecting said sender with said control equipment, means for transmitting registered designations from said sender to said control equipment to cause said control equipment to operate said switches to connect said one incoming trunk with an outgoing trunk, means responsive to the connection of said incoming trunk with said outgoing trunk to disconnect said sender from said incoming trunk, timing means in said sender, means responsive to the connection of said incoming trunk with said sender to initiate the operation of said timing means, means responsive to the disconnection of said sender from said incoming trunk to stop the operation of said timing means, a time-out relay, means under the control of said timing means after said timing means has measured a predetermined time interval, prior to the disconnection of said sender, to operate said time-out relay, means normally under the control of said time-out relay to transmit a first signal to said control equipment, means in said control equipment responsive to said first signal to cause said control equipment to connect said incoming trunk with one of said local signaling trunks, key controlled means common to said senders to cause said time-out-relay to transmit a different signal to said control equipment, a trouble recorder, means in said control equipment responsive to said different signal to operate said trouble recorder, means responsive to the operation of said trouble recorder to cause said sender to transmit said first signal to said control equipment, a holding relay in said sender, means common to said senders to operate said holding relay and means responsive to the operation of said holding relay to prevent the disconnection of said sender from said incoming trunk and to prevent the transmission of said first signal to said control equipment responsive to the operation of said trouble recorder.

11. In a telephone system incoming trunks, outgoing trunks, local signaling trunks, switches for connecting said incoming trunks to said outgoing trunks or to said local signaling trunks, senders, means for connecting one of said senders to an incoming trunk, means in said sender for registering designations received over said incoming trunk, control equipment for controlling the operation of said switches, means for connecting said sender with said control equipment, means for transmitting registered designations from said sender to said control equipment to cause said control equipment to operate said switches to connect said one incoming trunk with an outgoing trunk, means responsive to the connection of said incoming trunk with said outgoing trunk to disconnect said sender from said incoming trunk, timing means in said sender, means responsive to the connection of said incoming trunk with said sender to initiate the operation of said timing means, means responsive to the disconnection of said sender from said incoming trunk to stop the operation of said timing means, a time-out relay, means under the control of said timing means after said timing means has measured a predetermined time interval, prior to the disconnection of said sender, to operate said time-out relay, means normally under the control of said time-out relay to transmit a first signal to said control equipment, means in said control equipment responsive to said first signal to cause said control equipment to connect said incoming trunk with one of said local signaling trunks, key controlled means common to said senders to cause said time-out relay to transmit a different signal to said control equipment, a trouble recorder, means in said control equipment responsive to said different signal to operate said trouble recorder, means responsive to the operation of said trouble recorder to disconnect said sender from said control equipment, means responsive to said disconnection to reoperate said connecting means to connect said sender with said control equipment and means responsive to the reconnection of said sender with said control equipment to cause said sender to transmit said first signal to said reconnected control equipment.

12. In a telephone system incoming trunks, outgoing trunks, local signaling trunks, switches for connecting said incoming trunks to said outgoing trunks or to said local signaling trunks, senders, means for connecting one of said senders to an incoming trunk, means in said sender for registering designations received over said incoming trunk, control equipment for controlling the operation of said switches, means for connecting said sender with said control equipment, means for transmitting registered designations from said sender to said control equipment to cause said control equipment to operate said switches to connect said one incoming trunk with an outgoing trunk, means responsive to the connection of said incoming trunk with said outgoing trunk to disconnect said sender from said incoming trunk, timing means in said sender, means responsive to the connection of said incoming trunk with said sender to initiate the operation of said timing means, means responsive to the disconnection of said sender from said incoming trunk to stop the operation of said timing means, a time-out relay, means under the control of said timing means after said timing means has measured a predetermined time interval, prior to the disconnection of said sender, to operate said time-out relay, means normally under the control of said time-out relay to transmit a first signal to said control equipment to cause said control equipment to connect said incoming trunk with one of said local signaling trunks, key controlled means common to said senders to cause said time-out relay to transmit a different signal to said control equipment, a trouble recorder, means in said control equipment responsive to said different signal to operate said trouble recorder, means responsive to the operation of said trouble recorder to cause said sender to transmit said first signal to said control equipment, and means to prevent the disconnection of said sender from said incoming trunk and to prevent the transmission of said first signal to said control equipment responsive to the operation of said trouble recorder comprising a holding relay in said sender, operating means for said holding relay common to said senders, means responsive to the operation of said holding relay for transmitting a disabling signal to said operating means, means for disabling said operating means and key controlled means for rendering said disabling means responsive to the disabling signals from said senders.

13. In a telephone system incoming trunks, outgoing trunks, local signaling trunks, switches for connecting said incoming trunks to said outgoing trunks or to said local signaling trunks, senders, means for connecting one of said senders to an incoming trunk, means in said sender for registering designations received over said incoming trunk, control equipment for controlling the operation of said switches, means for connecting said sender with said control equipment, means for transmitting registered designations from said sender to said control equipment to cause said control equipment to operate said switches to connect said one incoming trunk with an outgoing trunk, means responsive to the connection of said incoming trunk with said outgoing trunk to disconnect said sender from said incoming trunk, timing means in said sender, means responsive to the connection of said incoming trunk with said sender to initiate the operation of said timing means, means responsive to the disconnection of said sender from said incoming trunk to stop the operation of said timing means, a time-out relay, means under the control of said timing means after said timing means has measured a predetermined time interval, prior to the disconnection of said sender, to operate said time-out relay, means normally under the control of said time-out relay to transmit a first signal to said control equipment, means in said control equipment responsive to said first signal to cause said control equipment to connect said incoming trunk with one of said local signaling trunks, key controlled means common to said senders to cause said time-out relay to transmit a different signal to said control equipment, a trouble recorder, means in said control equipment responsive to said different signal to operate said trouble recorder, means responsive to the operation of said trouble recorder to cause said sender to transmit said first signal to said control equipment, and means to prevent the disconnection of said sender from said incoming trunk and to prevent the transmission of said first signal to said control equipment responsive to the operation of said trouble recorder, comprising a holding relay in said sender, operating means for said holding relay common to said senders, means responsive to the operation of said holding relay for transmitting a disabling signal to said operating means, means for disabling said operating means and key controlled means for rendering said disabling means responsive to the disabling signal from a single sender or responsive to the disabling signals from a plurality of senders.

14. In a telephone system, incoming trunks, outgoing trunks, local signaling trunks, switches for connecting said incoming trunks to said outgoing trunks or to said local signaling trunks, senders for registering designations received over said incoming trunks, control equipment for controlling the operation of said switches, means for transmitting registered designations from said senders to said control equipment to operate said switches to connect an incoming trunk with an outgoing trunk, means for transmitting a special trunk request signal from said senders to said control equipment, timing means, means operated when all of said senders are busy, indicating means in said sender responsive to the connection of said incoming trunk with said outgoing trunk, means under the joint control of said all-senders-busy means and said connection indicating means to initiate the operation of said timing means, and means responsive to the complete operation of said timing means to transmit said special trunk request signal to said control equipment to cause said control equipment to disconnect said incoming trunk from said outgoing trunk and to connect said incoming trunk with one of said local signaling trunks.

15. In a telephone system, incoming trunks, outgoing trunks, local signaling trunks, switches for connecting said incoming trunks to said outgoing trunks or to said local signaling trunks, senders for registering designations received over said incoming trunks, control equipment for controlling the operation of said switches, means for transmitting registered designations from said senders to said control equipment to cause said control equipment to operate said switches to connect an incoming trunk with an outgoing trunk, means for transmitting a special trunk request signal from said senders to said control equipment, timing means, means operated when all of said senders are busy, indicating means in said sender responsive to the connection of said incoming trunk with said outgoing trunk, means under the joint control of said all-senders-busy means and said connection indicating means to initiate the operation of said timing means, means responsive to the complete operation of said timing means to operate said special signal transmitting means, means in said control equipment normally responsive to said special signal to cause said control equipment to disconnect said incoming trunk from said outgoing trunk and to operate said switches to connect said incoming trunk with one of said local signaling trunks, a trouble recorder, manually controlled means for rendering said control equipment responsive to said special signal to operate said trouble recorder, and means responsive to the operation of said trouble recorder to cause said control equipment to operate said switches to connect said incoming trunk with one of said local signaling trunks indicated by said trunk request signal.

References Cited in the file of this patent

UNITED STATES PATENTS

| | | |
|---|---|---|
| 1,848,174 | Irvine et al. | Mar. 8, 1932 |
| 2,183,656 | Ostline | Dec. 19, 1939 |
| 2,272,311 | Sigo | Feb. 10, 1942 |
| 2,652,455 | Lomax | Sept. 15, 1953 |